US010511249B2

(12) United States Patent
Seo et al.

(10) Patent No.: US 10,511,249 B2
(45) Date of Patent: Dec. 17, 2019

(54) INVERTER DRIVING DEVICE, ELECTRIC BRAKE APPARATUS, AND ELECTRIC POWER STEERING APPARATUS

(71) Applicant: Hitachi Automotive Systems, Ltd., Hitachinaka-shi, Ibaraki (JP)

(72) Inventors: Masahiro Seo, Tokyo (JP); Toshiyuki Ajima, Tokyo (JP); Shigehisa Aoyagi, Tokyo (JP); Takafumi Hara, Tokyo (JP); Masaki Kashima, Hitachinaka (JP); Yawara Kato, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/752,438

(22) PCT Filed: Jul. 29, 2016

(86) PCT No.: PCT/JP2016/072281
§ 371 (c)(1),
(2) Date: Feb. 13, 2018

(87) PCT Pub. No.: WO2017/043212
PCT Pub. Date: Mar. 16, 2017

(65) Prior Publication Data
US 2019/0013761 A1   Jan. 10, 2019

(30) Foreign Application Priority Data

Sep. 11, 2015 (JP) .................................. 2015-179056

(51) Int. Cl.
*H02P 6/10* (2006.01)
*H02P 27/04* (2016.01)
(Continued)

(52) U.S. Cl.
CPC .............. *H02P 27/08* (2013.01); *B60T 7/042* (2013.01); *B60T 13/662* (2013.01);
(Continued)

(58) Field of Classification Search
CPC ........... H02P 6/10; H02P 27/047; H02P 27/08
See application file for complete search history.

(56) References Cited

U.S. PATENT DOCUMENTS

| 4,663,578 | A | * | 5/1987 | Iwasaki | ................. H02P 27/047 318/762 |
| 2006/0052915 | A1 | * | 3/2006 | Sato | ........................ B60L 50/16 701/22 |

(Continued)

FOREIGN PATENT DOCUMENTS

| JP | 2012-105417 A | 6/1999 |
| JP | 2007-159348 A | 6/2007 |

(Continued)

OTHER PUBLICATIONS

International Search Report (PCT/ISA/210) issued in PCT Application No. PCT/JP2016/072281 dated Oct. 25, 2016 with English translation (Two (2) pages).

(Continued)

*Primary Examiner* — Bickey Dhakal
*Assistant Examiner* — Cortez M Cook
(74) *Attorney, Agent, or Firm* — Crowell & Moring LLP

(57) ABSTRACT

A motor driving device controls driving of an inverter device, detects current values in two phases, and compensates a value. The motor driving device detects current values in two phases, namely, a maximum phase current value and a minimum phase current value, within a single cycle of a PWM carrier frequency. The motor driving device compensates a value obtained by subtracting an absolute value of a difference between two absolute values, namely, the detected maximum phase current value and minimum phase current value, from the smaller value of the absolute values, as the offset current component.

8 Claims, 11 Drawing Sheets

(51) Int. Cl.
    *H02P 27/08*     (2006.01)
    *B62D 5/04*     (2006.01)
    *B60T 7/04*     (2006.01)
    *B60T 13/66*     (2006.01)
    *B60T 13/74*     (2006.01)
    *H02P 6/28*     (2016.01)
    *H02P 6/16*     (2016.01)

(52) U.S. Cl.
    CPC ............ *B60T 13/745* (2013.01); *B62D 5/046* (2013.01); *H02P 6/16* (2013.01); *H02P 6/28* (2016.02)

(56) References Cited

U.S. PATENT DOCUMENTS

| | | | |
|---|---|---|---|
| 2010/0066284 A1* | 3/2010 | Iwaji | H02P 6/187 |
| | | | 318/400.02 |
| 2012/0112673 A1 | 5/2012 | Maekawa | |
| 2012/0139460 A1* | 6/2012 | Senkou | H02P 21/50 |
| | | | 318/400.02 |
| 2014/0125264 A1* | 5/2014 | Nakamura | H02P 6/10 |
| | | | 318/400.23 |
| 2014/0176027 A1 | 6/2014 | Osaki et al. | |
| 2014/0239861 A1* | 8/2014 | Ajima | H02P 6/10 |
| | | | 318/400.17 |

FOREIGN PATENT DOCUMENTS

| | | |
|---|---|---|
| JP | 2008-160915 A | 7/2008 |
| JP | 2010-110067 A | 5/2010 |
| JP | 2014-128087 A | 7/2014 |
| KR | 10-0708923 B1 | 4/2007 |

OTHER PUBLICATIONS

Japanese-language Written Opinion (PCT/ISA/237) issued in PCT Application No. PCT/JP2016/072281 dated Oct. 25, 2016 (Two (2) pages).

Korean-language Office Action issued in counterpart Korean Application No. 10-2018-7006489 dated Aug. 19, 2019 with English translation (13 pages).

* cited by examiner

FIG. 2

| VOLTAGE VECTOR | PWM PATTERN (U,V,W) | MOTOR CURRENT Iu, Iv, Iw | DIRECT CURRENT Idc |
|---|---|---|---|
| V0 | (0,0,0) | $0 = Iu + Iv + Iw$ | 0 |
| V1 | (1,0,0) | $Iu = -(Iv + Iw)$ | Iu |
| V2 | (1,1,0) | $-Iw = Iu + Iv$ | -Iw |
| V3 | (0,1,0) | $Iv = -(Iu + Iw)$ | Iv |
| V4 | (0,1,1) | $-Iu = Iv + Iw$ | -Iu |
| V5 | (0,0,1) | $Iw = -(Iu + Iv)$ | Iw |
| V6 | (1,0,1) | $-Iv = Iu + Iw$ | -Iv |
| V7 | (1,1,1) | $0 = Iu + Iv + Iw$ | 0 |

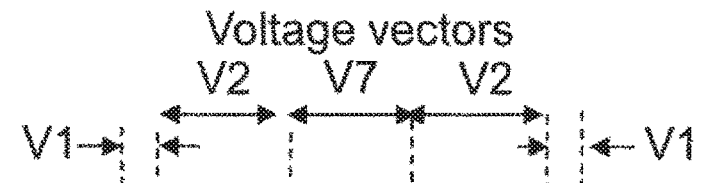
FIG. 3A
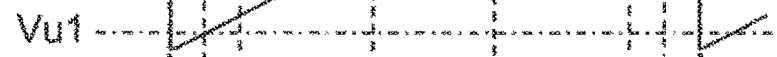
FIG. 3B
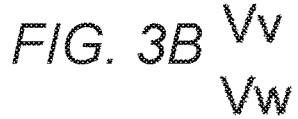
FIG. 3C
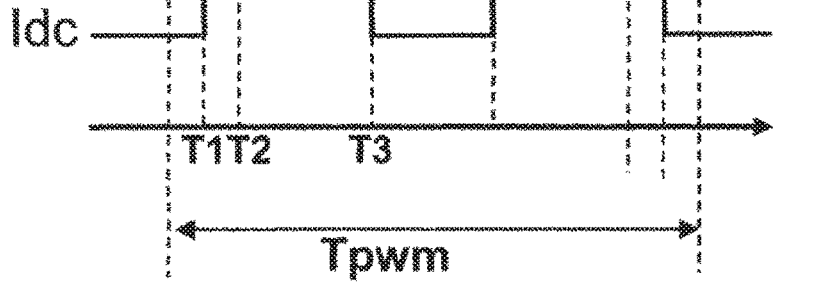

MOTOR VOLTAGE COMMAND

MOTOR CURRENT

CURRENT DETECTION VALUE $$I_2(\theta_a) = \frac{1}{2}I_p + I_{offs} \qquad I_1(\theta_a) = I_p + I_{offs}$$

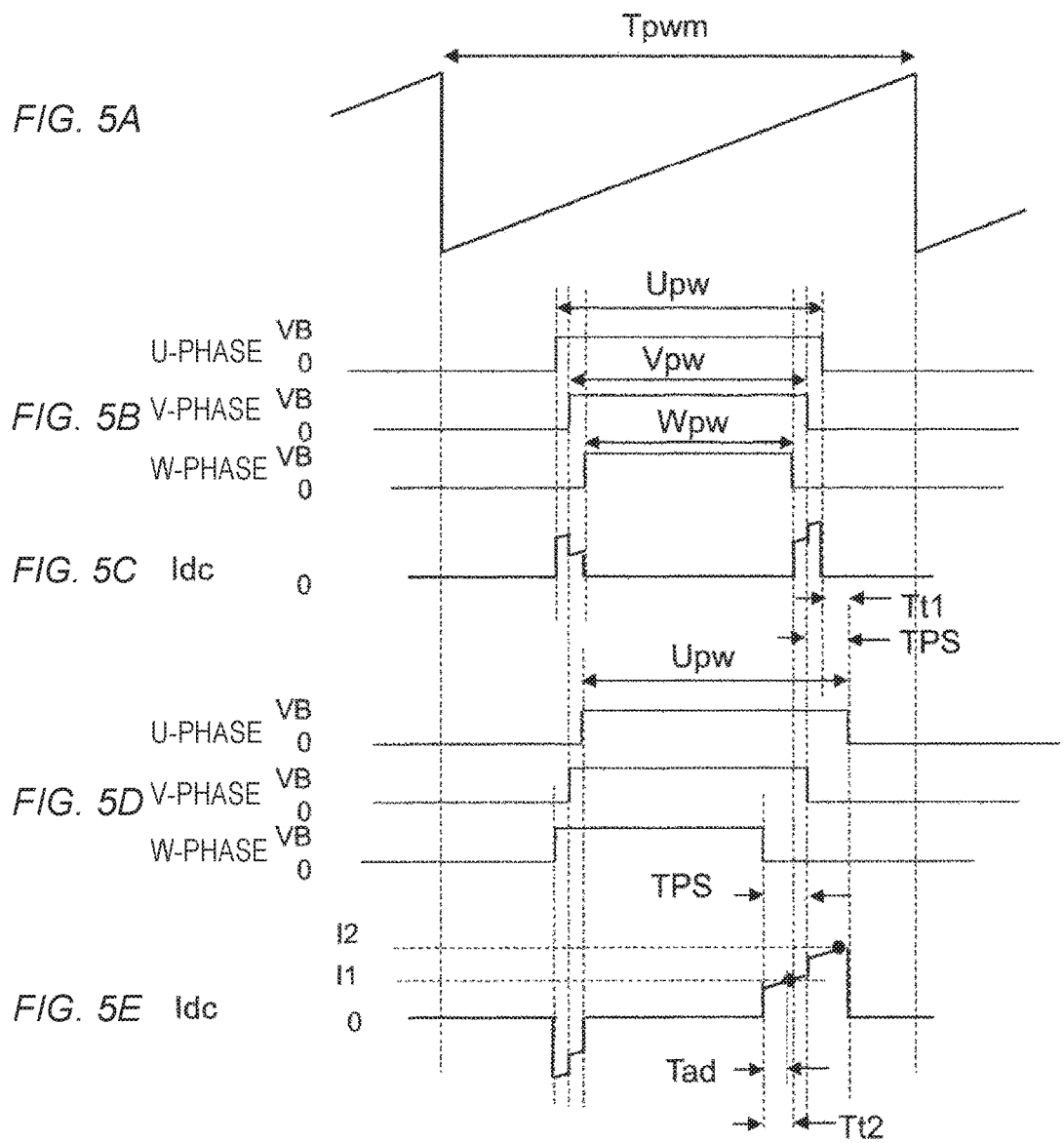

INVERTER DRIVING DEVICE, ELECTRIC BRAKE APPARATUS, AND ELECTRIC POWER STEERING APPARATUS

TECHNICAL FIELD

The present invention relates to an inverter driving device for controlling a motor current using a detected value of a direct bus current of an inverter, and an electric system using the inverter driving device.

BACKGROUND ART

An inverter driving device applies an electric current to a motor to control the operation of the motor. It is desired for such an inverter driving device to control a motor current for appropriately controlling the magnitude and phase of the voltage applied to the motor and, additionally, reducing the number of current sensors that detect the motor current, thus detecting the motor current using a detected value of the direct bus current of the inverter.

PTL 1 discloses a system for detecting an instantaneous value of the direct bus current to determine an offset amount of the direct bus current detecting circuit. In particular, PTL 1 discloses a technique to detect a value of the direct bus current as an offset compensation amount at timing (vector V0) in a period during which one of high-potential side and low-potential side switching elements of the inverter is subjected to off-operation.

CITATION LIST

Patent Literature

PTL 1: JP 2014-128087 A

SUMMARY OF INVENTION

Technical Problem

In PTL 1, if ground fault occurs in a motor winding, a ground fault current is flowed back in the PWM period in which vector V0 is generated. Accordingly, the ground fault current is misdetected as an offset current, and the misdetected offset detection value is used for offset correction. This action decreases current detection accuracy.

If sky fault occurs in the motor winding, the sky fault current flows into the direct bus current in the PWM period in which vector V0 is generated. Again, the offset detection value is misdetected and used for the offset correction, so that the current detection accuracy decreases.

It is an object of the present invention to provide an inverter driving device capable of accurately detecting an offset amount of a current detection circuit that detects a motor current using a direct bus current, and compensating for the detected offset amount to improve detection accuracy of the motor current, so as to control the motor appropriately without increasing the number of components of the inverter driving device.

Solution to Problem

An inverter driving device of the present invention is configured to control driving of an inverter device that converts direct-current power supplied from a power source and outputs three-phase alternate-current power to a motor, in which the inverter driving device is configured to: detect a direct bus current flowing between the power source and the inverter device; calculate an offset current component to be superimposed on a detected value using the detected value where current values in two phases of the three-phase alternating current calculated in accordance with the detected value of the direct bus current substantially coincide with each other; and control driving of the inverter device in accordance with a current value for which the offset current component is compensated.

Advantageous Effects of Invention

The inverter driving device according to the present invention can detect the offset correction amount even when the ground fault or sky fault of the motor occurs, thus improving detection accuracy of the motor current and controlling the motor with high accuracy.

BRIEF DESCRIPTION OF DRAWINGS

FIG. 2 is a table illustrating a relationship between the direct current and the motor current according to a first embodiment.

FIGS. 3A to 3C are waveform diagrams illustrating current detection timing according to the first embodiment.

FIGS. 5A to 5E are characteristic views illustrating a pulse shift operation of the first embodiment.

DESCRIPTION OF EMBODIMENTS

Figure 1:
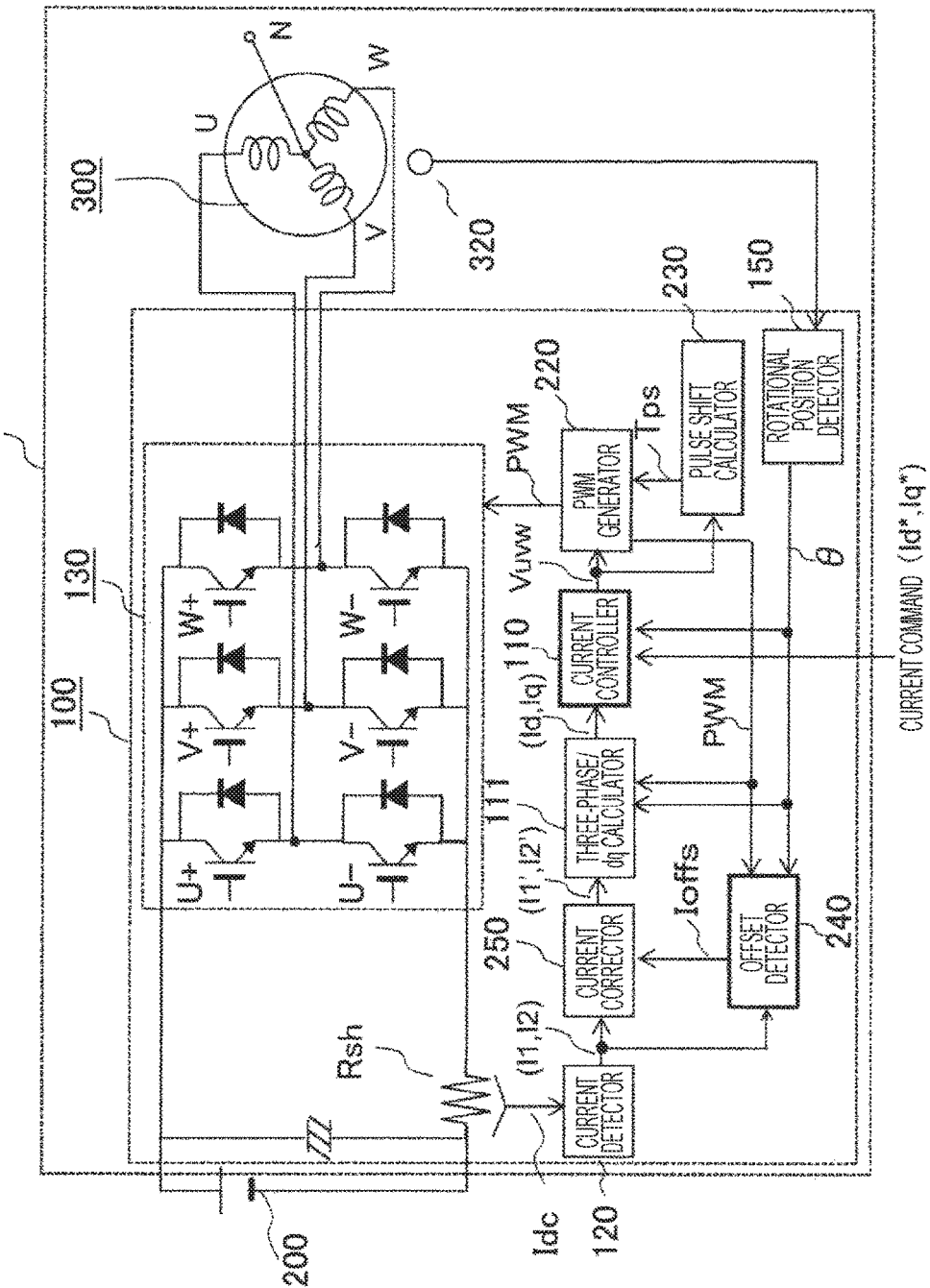
FIG. 1 is a block diagram illustrating a configuration of a motor device of the present invention.

FIG. 1 is a block diagram illustrating a configuration of a motor driving device including an inverter device according to a first embodiment of the present invention.

A motor device 500 includes a motor 300 and a motor driving device 100. The motor device 500 of the present embodiment is useful in the application of driving a motor with high efficiency by switching a PWM carrier frequency of the inverter corresponding to the output of the motor, thus improving detection accuracy of a direct bus current of the inverter.

The motor driving device 100 includes an inverter circuit 130, a shunt resistor Rsh, a current detector 120 for detecting the direct bus current of the inverter circuit 130, a pulse shift calculator 230, an offset detector 240, a three-phase/dq calculator 111, a current controller 110, and a PWM generator 220.

A battery 200 is a direct-current voltage source of the motor driving device 100. A direct-current voltage VB of the battery 200 is converted to a three-phase alternating current having a variable voltage and a variable frequency by the inverter circuit 130 of the motor driving device 100, and applied to the motor 300.

The motor 300 is a synchronous motor that is rotationally driven upon supply of a three-phase alternating current. The motor 300 is equipped with a rotational position sensor 320. A rotational position detector 150 calculates a detection position θ from an input signal of the rotational position sensor 320, and calculates a rotational speed ωr. The rotational position sensor 320 is preferably a resolver made of an iron core and a winding, but a sensor using a magnetic resistance element, such as a GMR sensor, or a Hall effect element can also be used.

The motor driving device 100 has a current control function for controlling the output of the motor 300. The motor driving device 100 includes the shunt resistor Rsh between a smoothing capacitor and the inverter circuit 130. A pulsed direct bus current (hereinafter simply referred to as a direct current) flowing into the inverter circuit 130 is detected as a voltage (a current detection value Idc) across the shunt resistor Rsh. In the example shown, the shunt resistor Rsh is disposed on the negative pole side of the battery, but may also be disposed on the positive side of the battery.

The current detector 120 detects at least two detection values (I1, I2) within one PWM cycle at trigger timing Trig of the pulse shift calculator 230.

The three-phase/dq calculator 111 calculates a three-phase motor current value (Iu, Iv, Iw) from the current value (I1', I2'), which is corrected by a current corrector 250, and a PWM pulse pattern (PWM), and calculates a dq motor current value (Id, Iq), which has been dq converted, from the three-phase motor current value Iuvw (Iu, Iv, Iw) and the rotational position θ. The current corrector 250 and the offset detector 240 that detects the offset amount for current correction are critical components of the invention and will be described more in detail.

The current controller 110 calculates a voltage command value (Vd*, Vq*) so that the dq current value (Id, Iq) coincides with the current command value (Id*, Iq*), which is generated corresponding to a target torque, and then calculates a three-phase voltage command value Vuvw (Vu*, Vv*, Vw*), which has been UVW converted, from the voltage command (Vd*, Vq*) and a rotational position θ.

The PWM generator 220 outputs a PWM pulse (PWN) which has been subjected to pulse width modulation on the three-phase voltage command value Vuvw (Vu*, Vv*, Vw*). The PWM pulse carries out on-off control of semiconductor switch elements of the inverter circuit 130 via a drive circuit to regulate the output voltage.

To control the rotational speed of the motor 300, the motor device 500 calculates a rotational speed ωr of the motor according to a change with time of the rotational position θ, and generates a voltage command or a current command coinciding with a speed command from an upper controller. Further, to control the motor output torque, the dq motor current command (Id*, Iq*) is generated using a relation equation or a map of a dq motor current (Id, Iq) relative to the motor torque.

Next, an operation of calculating the three-phase motor current by detecting the direct current is described by referring to FIGS. 2 and 3. FIG. 2 illustrates a relationship between voltage vector (PWM pattern) of the output voltage, motor current (Iu, Iv, Iw), and the direct current Idc of the inverter. The switching elements of the inverter circuit 130 are subjected to on-off control corresponding to the PWM pattern, and voltage vector (V0 to V7) is output.

Individual PWM patterns correspond to the relationship between the direction of the motor current and the direct current. Accordingly, the three-phase motor current can be calculated by detecting the pulsed direct current.

FIG. 3 illustrates one cycle (one PWM cycle) of PWM (Vu, Vv, Vw) of the carrier frequency relative to the pulsed direct current (Idc). A timer operation for generating PWM is illustrated at (a). PWM pulses illustrated at (b) are generated when a sawtooth or triangular wave coincides with voltage command values. In FIG. 3, a U-phase PWM pulse rises at timing T1 when a voltage command Vu1 coincides with a sawtooth-wave-like timer count value, and a voltage Vu is output as a U-phase output of the inverter. Subsequently, the U-phase PWM pulse falls at timing when a voltage command Vu2 coincides with the sawtooth-wave-like timer count value. Similar operations are carried out for V- and W-phases. The direct current Idc during the operation is illustrated at (c). Thus, current sampling is carried out twice in one PWM cycle to allow detection of the motor currents in two phases. The motor current of the remaining one phase can be calculated from the relationship Iu+Iv+Iw=0.

To reliably detect a peak of the pulsed direct current, a minimum pulse width TPS is needed. Meanwhile, to improve the detection accuracy of a further thinner PWM pulse, the pulse shift calculator 230 preliminary calculates a signal difference (pulse width of a line voltage) of the PWM pulses in two phases to sample the current at appropriate timing Trig for detection by the current detector 120. Decisive factors in determining the minimum pulse width TPS include a magnitude of inductance of the main circuit of the inverter, a through rate and responsiveness of the detection circuit of the inverter, and sampling time of A/D converter of the inverter.

Figure 4A:
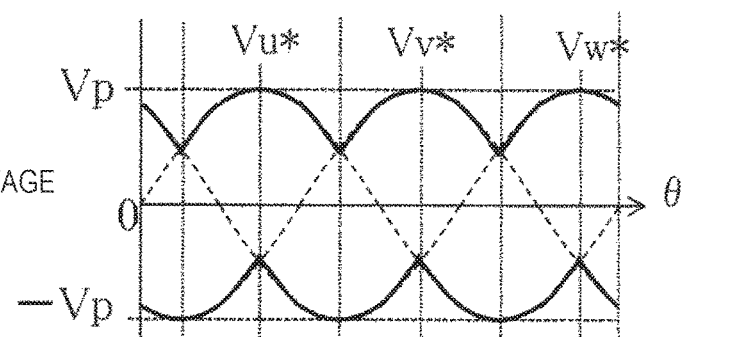
FIGS. 4A to 4C are waveform diagrams illustrating an offset detection operation of the first embodiment.
Figure 4B:
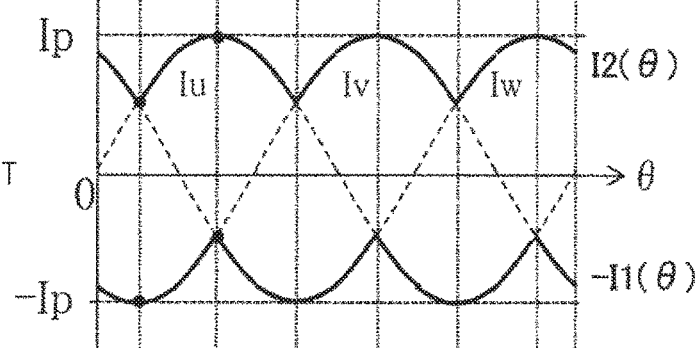
Figure 4C:
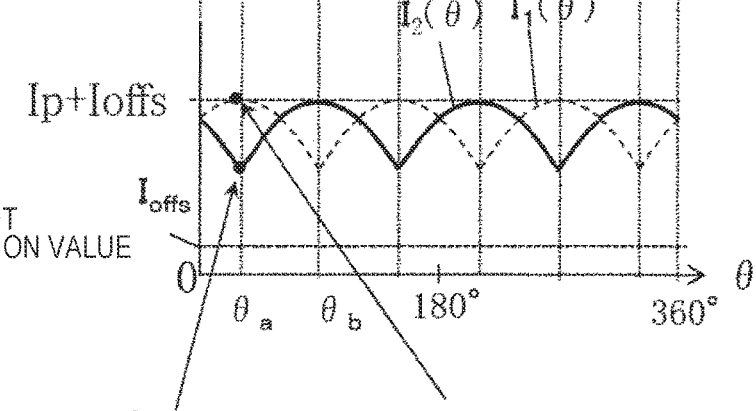

Next, the offset detector 240 of the present embodiment is described by referring to FIG. 4. FIG. 4 illustrates an example of offset detection in a case where a motor rotates at a relatively low speed and the voltage and the current are in phase with each other. A three-phase motor voltage command value is illustrated at (a), a three-phase motor current is illustrated at (b), and a current detection value detected on the direct bus current is illustrated at (c).

In the motor voltage command illustrated in FIG. 4(a), the motor voltage command values in two phases substantially coincide with each other at a rotational position θ and a cycle period of 60 degrees. When the motor rotates at a relatively low speed, the three-phase motor current illustrated at (b) is substantially in phase with the motor voltage command illustrated at (a). In the three-phase motor current having a wave peak value Ip, the current value at the maximum phase is I2 (θ) and the current value at the minimum phase is −I1(θ). Thus, the motor currents in two phases have a substantially coincident waveform (cross-points) at a cycle period of 60 degrees.

If the current detection offset Ioffs is zero, the current detection values on the direct current bus are I1 (θa) and I2 (θa) at an angle θa. For example, if a case where Iu=sin(θ), Iv=sin(θ+120), and Iw=sin(θ−120) is considered, Iu=Iw=Ip/2, Iv=−Ip, and I2(θa)=I1(θa)/2.

If the current detection offset Ioffs is approximately zero, I2(θa)=Ip/2+Ioffs, I1(θa)=Ip+Ioffs, as the peak values of I2(θ) and I1(θ) are Ip+Ioffs. Here, 2×I2(θa)−I1(θa)=Ioffs. That is, when the motor voltage command values in two phases are substantially coincident at the rotational position θ and the cycle period of 60 degrees, the offset amount Ioffs of the current detector can be calculated from the detection value of the direct current, even when the current detector includes the offset amount Ioffs.

The offset is detected by selecting equation (1) if $I1(\theta) > I2(\theta)$, and selecting equation (2) if $I1(\theta) < I2(\theta)$.

$$Ioffs = 2 \times I2(\theta) - I1(\theta) \quad \text{Equation (1)}$$

$$Ioffs = 2 \times I1(\theta) - I2(\theta) \quad \text{Equation (2)}$$

The inverter driving device of the present embodiment uses the current detection value detected at detection timing of a typical direct bus current illustrated in FIG. 3 to determine the offset amount Ioffs of the current detector 120 by the calculation using the current detection value in accordance with the rotational position signal $\theta$. The current corrector 250 calculates an ideal current detection value (I1', I2') from the current detection value (I1, I2) and the calculated offset amount Ioffs. By using such a current detection value, the three-phase/dq calculator 111 can control the motor with the high accuracy using the motor current value (Id, Iq).

In the above description, the offset amount is detected at the timing when the motor voltage command values in two phases substantially coincide with each other. The PWM pulse width may also be used instead of the motor voltage command. A similar effect can be obtained if the offset amount is detected at timing when the motor current values in two phases substantially coincide with each other instead of the motor voltage. A similar effect can further be obtained if the rotational position $\theta$ of the rotational position detector 150 of the motor is used to detect the offset at intervals of 60 degrees (30, 90, 150, 210, 270, and 330 degrees).

Next, the minimum pulse width TPS and the power source input current are described by referring to FIG. 5. A sawtooth wave timer count value which indicates the carrier cycle for generating PWM pulse is illustrated at (a). A PWM period enabled by an instantaneous voltage command in the typical inverter PWM pulse is indicated at (b). The direct current waveform Idc is indicated at (c).

The pulse width between the U-phase PWM pulse width Upw, the V-phase PWM pulse width Vpw, and the W-phase PWM pulse width Wpw is smaller than a time period Tad necessary for sampling the AD converter, and cannot be detected by, for example, the microcomputer. To flow a minute motor current, a line voltage is applied to the motor corresponding to a signal difference among the three-phase PWM pulses illustrated at (b). If, however, the PWM pulse does not have the minimum pulse width TPS, the direct current Idc cannot be detected and the motor current cannot be controlled properly.

Therefore, as illustrated at (d), the waveform of PWM pulse is subjected to phase shift (pulse shift) to generate a minimum pulse width TPS. This allows detection of the direct current Idc. The pulse width (Upw, Vpw, Wpw) of each phase illustrated at (d) is the same as the pulse width of each phase illustrated at (b). On the falling edge side of the PWM pulse, the U-phase pulse is delayed by a pulse shift amount Tt2 relative to the V-phase pulse. Thus, the pulse width for AD sampling is carried out such that the pulse width between the U-phase and V-phase pulses reaches the minimum pulse width TPS. On the rising edge side of the PWM pulse, the pulse width between the U-phase pulse and the V-phase pulse decreases to generate a pulse having an inverted polarity relative to the pulse with no pulse shift, as illustrated at (b), between the U-shape and V-shape pulses.

As a result, a sufficient A/D sampling time is generated, while an average value of the motor applied voltage in one PWM period can be equivalent to a no pulse-shift value as illustrated at (b). Thus, the motor can be controlled by adjusting the motor applied voltage and its phase. At this time, a direct current waveform Idc illustrated at (e) indicates that the area of the current pulse on the rising edge side of a PWM pulse edge decreases (to be so small that an area has negative magnitude in the drawing), while the area of the current pulse on the falling edge side of the PWM pulse edge increases. A total area of the current pulse in the PWM period illustrated at (e) is equivalent to an area of the current pulse in the PWM period at (c), but the A/D-detected current detection value becomes a direct current value (I1, I2) that is increased by a current Ips corresponding to the pulse shift.

Thus, the inverter driving device that detects the motor current near zero can detect the offset amount even when the PWM pulse shift is carried out, and performs offset compensation of the current detection value to accurately calculate the motor current for the motor control. Such an inverter driving device can advantageously be provided.

One example of the offset is a transient response of an IGBT, which is used as a switching element of the inverter circuit, at switch-on timing in accordance with the static capacity of a MOSFET. The static capacity delays rising, so that the current amount value flowing through the shunt resistor may be detected as a larger or smaller value than the actually-expected value. Such an error in the detection of the current due to the static capacity affects the detection of the motor torque and may lead to a decrease of control accuracy of the motor. By using the system according to the present embodiment, the offset value, which occurs at the detection of the current caused by the delayed rising, can be detected and corrected to achieve better control of the torque of the motor.

Figure 6:
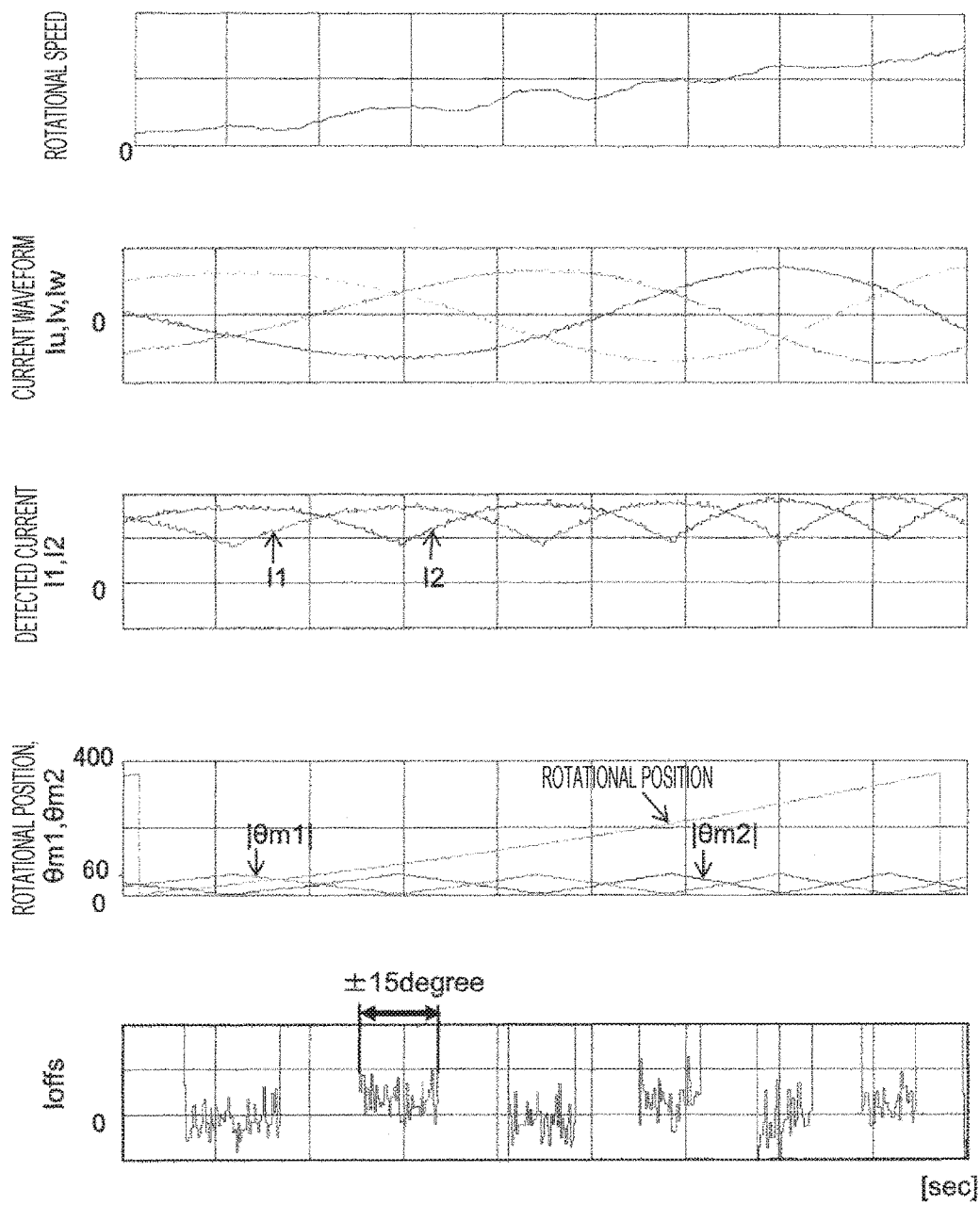
FIG. 6 is a waveform diagram illustrating current detecting timing of a second embodiment.

Next, a second embodiment is described by referring to FIG. 6, in which a method for detecting the current using the rotational position $\theta$ detected by the rotational position detector 150 of the motor is described.

The current detector can detect current which is expressed depending on the rotational position $\theta$ as follows:

$$I1 = Ip \cdot \cos(\theta m1) + Ioffs \quad \text{Equation (3)}$$

$$I2 = Ip \cdot \cos(\theta m2) + Ioffs \quad \text{Equation (4)}$$

where Ip is a peak value of the three-phase current, $\theta m1$ is a phase difference between the rotational position $\theta$ and the electric angle at which a peak value of the minimum phase current is obtained, and $\theta m2$ is a phase difference between the rotational position $\theta$ and the electric angle at which a peak value of the maximum phase current is obtained. This phase difference is equal to a phase difference from the cross-point of the currents in two phases, where $\theta m1$ and $\theta m2$ are in the range of −60 degrees to 60 degrees about the peak current value of each phase. FIG. 6 plots absolute values. Specifically, when the phase difference of the current I1 from the rotational position $\theta$ is 0 degree and accordingly I1 is at the maximum current value, the phase difference of the other current I2 from the rotational position $\theta$ is −60 degrees. Therefore, I2 becomes half the maximum current value if an offset amount Ioffs is not considered.

Here, equation (5) is satisfied:

$$I1 \cdot \cos(\theta m2) - I2 \cdot \cos(\theta m1) = Ip \cdot \{\cos(\theta m1)\cos(\theta m2) - \cos(\theta m2)\cos(\theta m1)\} + Ioffs \cdot \{\cos(\theta m2) - \cos(\theta m1)\} = Ioffs \cdot \{\cos(\theta m2) - \cos(\theta m1)\} \quad \text{Equation (5)}$$

Thus, equation (6) is satisfied:

$$Ioffs = \{I1 \cdot \cos(\theta m2) - I2 \cdot \cos(\theta m1)\} / \{\cos(\theta m2) - \cos(\theta m1)\} \quad \text{Equation (6)}$$

The offset amount Ioffs can be expressed by equation (6). This method allows calculation of the offset amount Ioffs of the current detector included in the detection value of the direct current, even when the voltage and current are not in phase, as illustrated in FIG. 6. Assigning θm2=60 degrees, θm1=0 degree to equation (6) gives:

$$Ioffs=\{(Ip+Ioffs)\cdot 0.5-(0.5\cdot Ip+Ioffs)\cdot 1\}/(-0.5)=(Ip+2Ioffs)-(Ip+Ioffs)=2\cdot(Ip\cdot 0.5+Ioffs)-(Ip\cdot 1+Ioffs)$$

This coincides with equation (2). By equation (6), the calculation and compensation of the offset amount Ioffs of the current detector can be carried out in a wider range of rotational angle θ than in the first embodiment, thus achieving better control of the three-phase current, as illustrated in FIG. 6.

Figure 7:
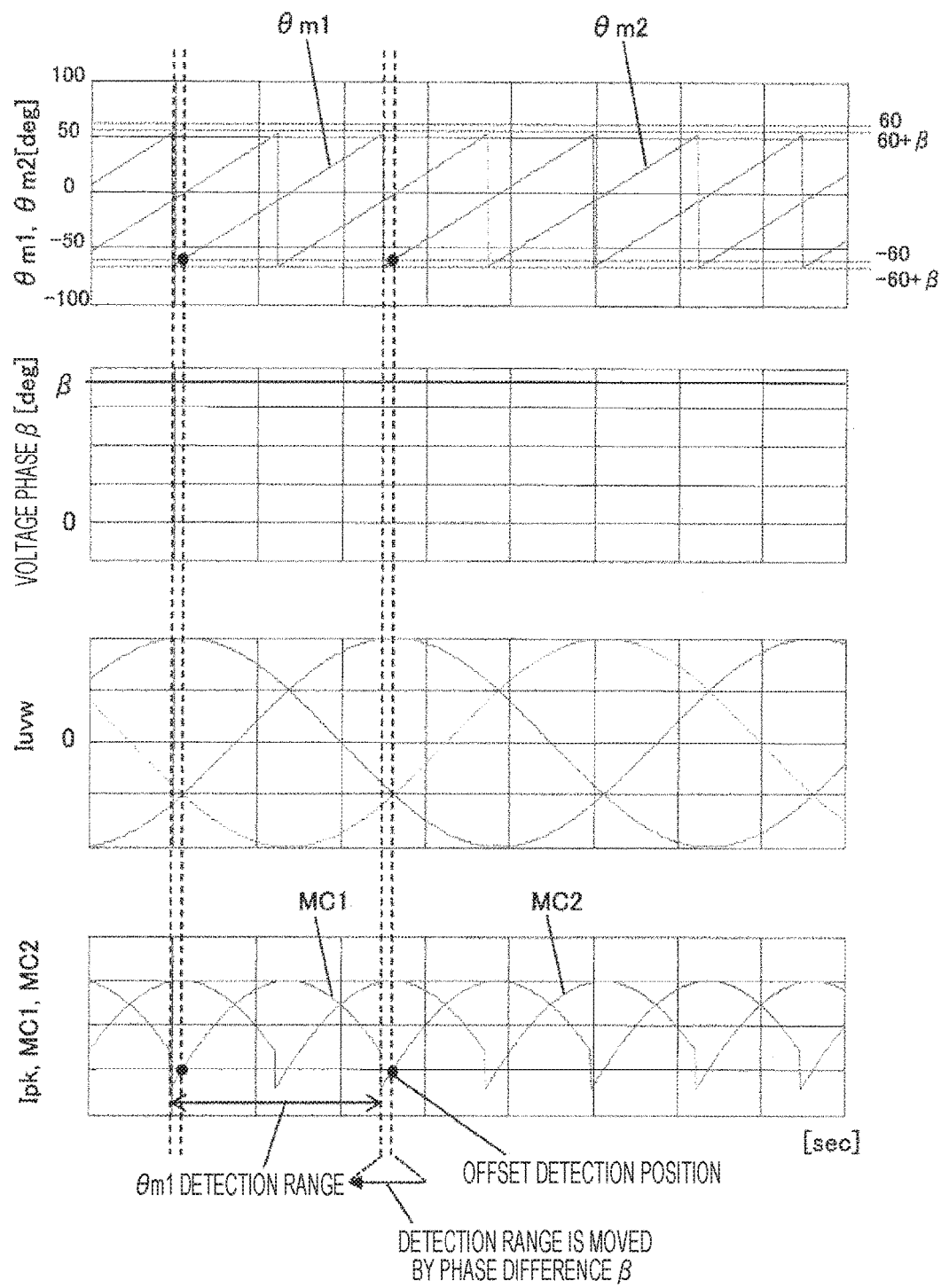
FIG. 7 is a waveform diagram illustrating the current detecting timing of the second embodiment.

Next, in the second embodiment, a method for detecting the offset amount when the phase difference of voltage and current are present from the q-axis is described by referring to FIG. 7. During rotation of the motor, a product of the rotational speed of the motor, a q-axis current Iq, and a q-axis inductance is calculated even when a d-axis current Id=0. Then, the obtained value of the product needs to be applied to the motor as a d-axis voltage Vd. Here, the voltage phase difference β between the voltage and the q-axis can, for example, be derived as follows:

$$\beta=\arctan(Vd/Vq)\times 180/\pi [\text{degree}] \qquad \text{Equation (7)}$$

The phase differences θm1 and θm2 from the peak values of the minimum phase current and the maximum phase current change by the voltage phase difference β of equation (7) to the range from −60+β to 60+β. By changing the detection range according to the value of Vd, the current detection can be carried out more accurately.

Figure 8:
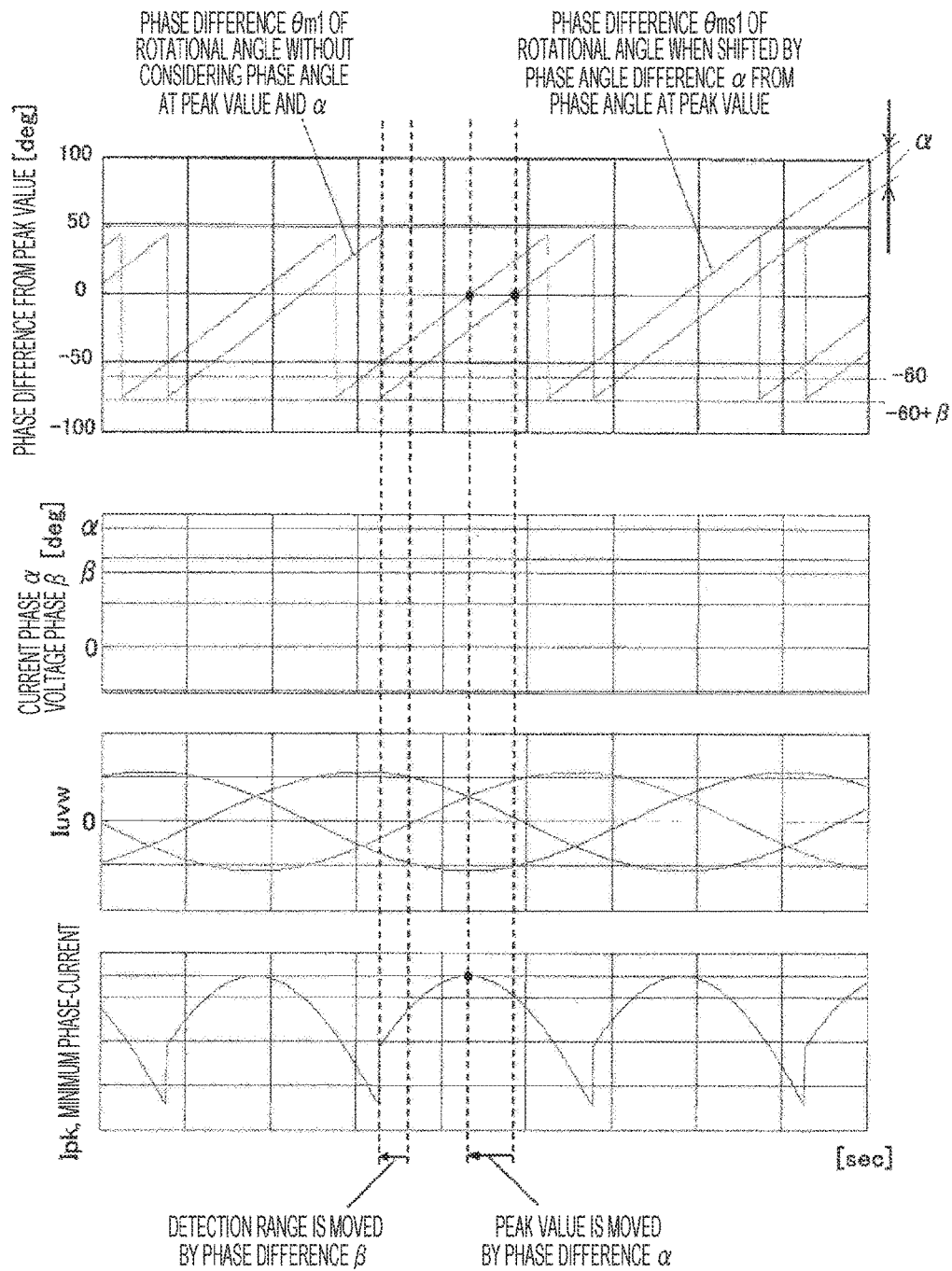
FIG. 8 is a waveform diagram illustrating the current detection timing of the second embodiment.

FIG. 8 illustrates the current detection when the d-axis current Id and the d-axis voltage Vd are applied. For simplification, only θm1 is illustrated. As described above, the application of Vd changes the phase differences θm1 and θm2 to the range from −60+β to 60+β. When Id is added, the peak of the current is shifted by the current phase difference α from the q-axis. This requires correction by α with respect to the rotational angle. For example, the current phase difference α is derived as follows:

$$\alpha=\arctan(Id/Iq)\times 180/\pi [\text{degree}] \qquad \text{Equation (8)}$$

θm1 and θm2 are shifted to generate θms1 and θms2, respectively, as follows:

$$\theta ms1=\theta m1+\alpha, \theta ms2=\theta m2+\alpha \qquad \text{Equation (9)}$$

Thus, assigning equation (9) to equation (6) gives equation (10):

$$Ioffs=\{I1\cdot\cos(\theta ms2)-I2\cdot\cos(\theta ms1)\}/\{\cos(\theta ms2)-\cos(\theta ms1)\} \qquad \text{Equation (10)}$$

Here, if α=25 degrees, θm1=−25 degrees, and θm2=35 degrees, then Ioffs={(0.5·Ip+Ioffs)·1−(Ip+Ioffs)·0.5}/0.5= (Ip+2Ioffs)−(Ip+Ioffs). This coincides with equation (2). By shifting the phase by α, the current detection with further improved accuracy can be achieved.

To estimate the rotational angle in the above-described methods, the rotational speed may be used. When the motor rotates at a high speed, the rotational angle is calculated stepwise. The stepwise rotational angle prevents smooth estimation of the rotational angle, so that the detection of the rotational angle that functions as the cross-point of the current of this method becomes difficult. For smoothing the rotational angle, which becomes stepwise during high speed operation, filtering is necessary to estimate an appropriate rotational angle.

Figure 9:
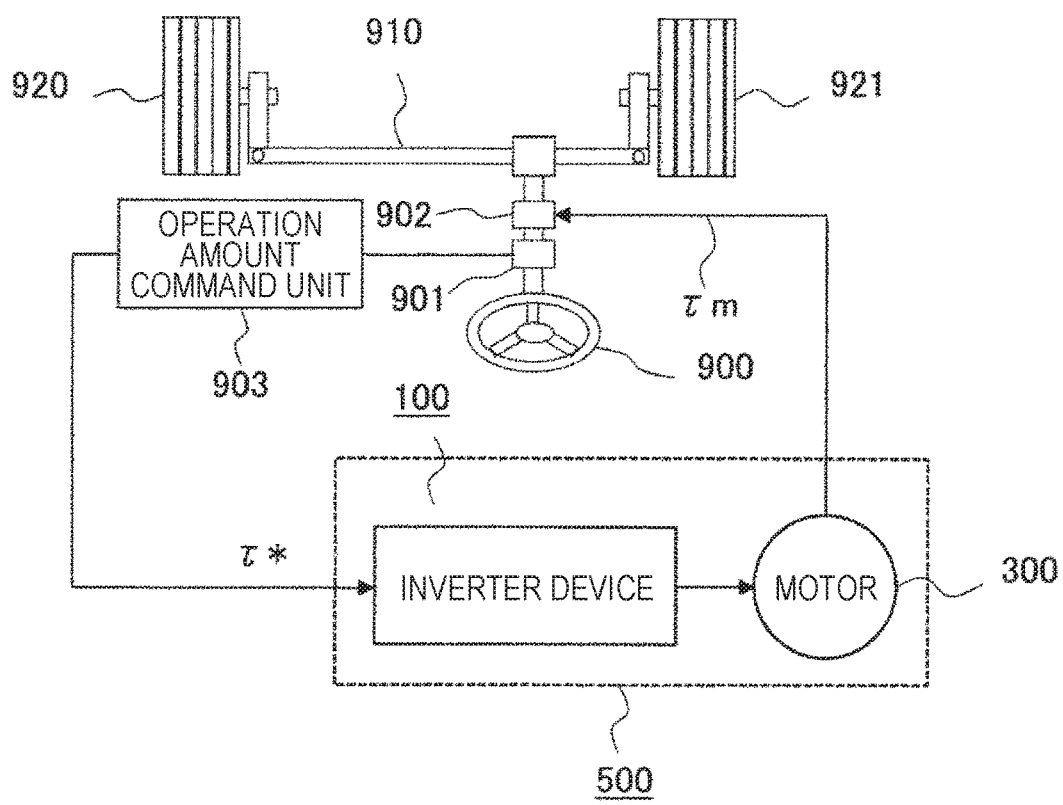
FIG. 9 illustrates the structure of an electric power steering apparatus to which a motor device of the present invention is applied.

Next, the motor driving device illustrated in the embodiments of the present invention is applied to an electric system. Such an electric system is implemented as an electric power steering apparatus and its structure is described by referring to FIG. 9. FIG. 9 illustrates the structure of an electric power steering apparatus to which the motor driving device of the embodiments of the present invention is applied.

As illustrated in FIG. 9, an electric actuator includes a torque transmission mechanism 902, a motor 300, and a motor driving device 100. The electric power steering apparatus includes the electric actuator, a steering wheel 900, a steering detector 901, and an operation amount command unit 903. Operating force of a driver applied to the steering wheel 900 provides torque assistance using the electric actuator.

A torque command τ* of the electric actuator is a steering assist torque command (generated by the operation amount command unit 903) of the steering wheel 900 to decrease the steering force of the driver by using the output of the electric actuator. The motor driving device 100 receives the torque command τ* as an input command to control the motor current, and controls the motor current so as to follow the torque command value from the torque constant of the motor 300 and the torque command τ*.

A motor output τm output from the output shaft, which is directory connected to the rotor of the motor 300, transmits torque to a rack 910 of the steering apparatus via a torque transmission mechanism 902 that uses a deceleration mechanism, such as a worm gear, a wheel gear, or a planetary gear, or a hydraulic mechanism, to eventually operate a steering angle of wheels 920 and 921 by reducing (assisting) the steering force (operating force) of the driver to operate the steering wheel 900 by an electric power.

The assisting amount is determined as a torque command τ* by the operation amount command unit 903, as a result of detecting the operation amount including the steering angle or steering torque by the steering detector 901 that detects the steering state incorporated in the steering shaft, and adding the status amount, such as a vehicle speed and road condition.

The motor driving device 100 of the present embodiment can prevent a decrease of controllability of the motor due to the offset amount caused by a temperature drift of the current detection circuit along with the temperature rise of an ECU. The temperature rise of the ECU occurs when a large motor current flows to obtain an excessive motor output while the steering wheel is repeatedly operated for a long time to stop or travel the vehicle at a very low speed, for example, to park the vehicle. Further, the current detection accuracy can be improved even when the pulse shift current varies with changes of a di/dt characteristic of the inverter driving circuit. Thus, a smooth steering assist can advantageously be achieved during turning back of the steering wheel.

Figure 10:
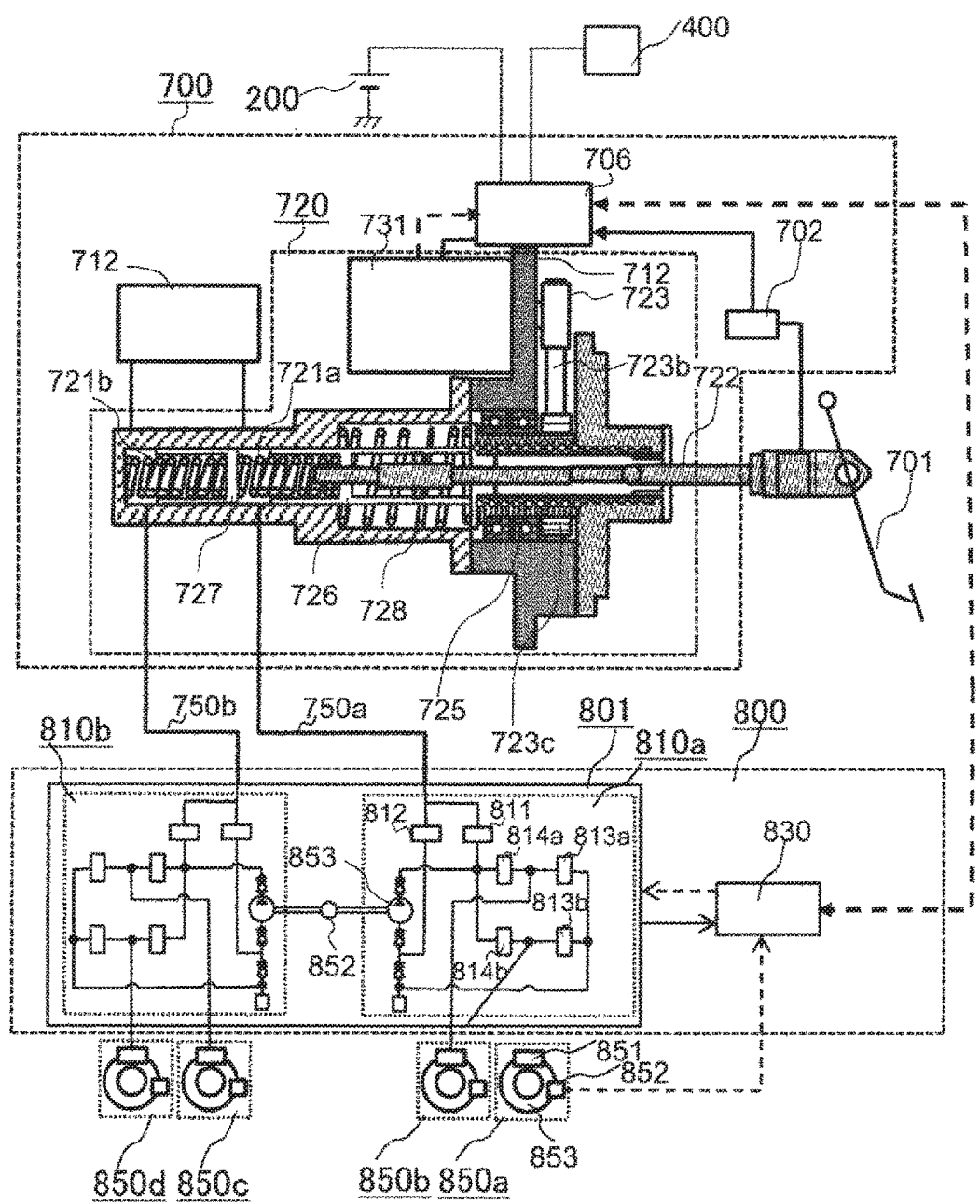
FIG. 10 illustrates the structure of an electric brake apparatus to which a motor device of the present invention is applied.

FIG. 10 is a system block diagram illustrating the structure of the embodiment of a vehicle brake apparatus. An assist control unit 706 of FIG. 10 and the motor driving device 100 have a similar function and are both programmed by a microcomputer to enable braking operation for a vehicle. A motor 731 differs from the motor 300 in that the motor 731 is installed integrally with a brake assist device 700. Further, the motor 731 differs from the first embodiment in that the motor 731 is formed integrally with the assist control unit 706 via a casing 711.

The vehicle brake apparatus includes a brake pedal 701, a brake assist device 700, a brake booster 800, and wheel mechanisms 850a to 850d. The brake assist device 700 includes an assist mechanism 720, a primary fluid chamber 721a, a secondary fluid chamber 721b, and a reservoir tank 712. An operation amount of the brake pedal 701 stepped on by the driver is input to the assist mechanism 720 via an input rod 722 and transmitted to the primary fluid chamber 721a.

The brake operation amount detected by a stroke sensor 702 attached to the brake pedal 701 is input to the assist control unit 706 that controls the assist mechanism 720. The assist control unit 706 controls the motor 731 so as to reach the rotational position corresponding to the input operation amount of the brake. The rotational torque of the motor is transmitted to a rotation-to-translation converting device 725 that converts a rotational power to a translation power via a deceleration device 723. The power then presses a primary piston 726 to raise a fluid pressure of the primary fluid chamber 721a, while pressurizing a secondary piston 727 to raise the fluid pressure of the secondary fluid chamber 721b.

The brake boost mechanism 800 inputs the pressure of an operating fluid, which is pressurized in the fluid chambers 721a and 721b, via master pipes 750a and 750b, and transmits the fluid pressure to the wheel mechanisms 850a to 850d in accordance with a command from a brake boost control unit 830 to achieve a breaking force of the vehicle.

The assist control unit 706 controls a displacement amount of the primary piston 726 to adjust a press amount of the primary piston 726. Since the displacement of the primary piston 726 is not directly detected, the rotational angle of the driving motor 731 is calculated in accordance with the signal from a rotational position sensor (not illustrated) provided in the motor. The displacement amount of the primary piston 726 is determined by calculation from a thrust amount of the rotation-to-translation converting device 725.

If the driving motor 731 stops by failure and the return control of the axis of a ball screw 725 is disabled, the reactive force of a return spring 728 returns the axis of the ball screw 725 to an initial position, so as not to interrupt the braking operation of the driver. For example, unstable behavior of the vehicle due to dragging of the brake can be avoided.

The brake boost mechanism 801 includes two systems of fluid pressure adjustment mechanisms 810a and 810b that adjust the operating fluid for each two diagonally-disposed wheels of four wheels to enable the vehicle to stop stably even when one system fails. Thus, the braking force of the wheel mechanisms 850a and 8509b of the diagonal two wheels can be adjusted individually. The two systems of the fluid pressure adjustment mechanisms 810a and 810b operate in a similar manner, and one system of the fluid pressure adjustment mechanism 810a is described below. The fluid pressure adjustment mechanism 810a includes a gate OUT valve 811 that controls a supply to a wheel cylinder 851, a gate IN valve 812 that similarly controls a supply to a pump, IN valves 814a and 814b that control the operating fluid pressure from the master pipe 750a or the supply of the operating fluid from the pump to the wheel cylinder 851, OUT valve 813a and 813b that control the pressure decrease of the wheel cylinder 851, a pump 853 that raises a master pressure generated by the operating fluid pressure from the master pipe 750a, and a pump motor 852 that drives the pump 853. For example, if the fluid pressure control for the anti-lock brake is carried out, the signal from the wheel rotation sensor 853 in the wheel mechanism 850 is processed by the boost control unit 830 and, when the wheel lock is detected during braking, adjusts the fluid pressure so as not to lock the wheels by operating the IN and OUT valves (electromagnetic) and the pump. This is also applicable to the case where the fluid pressure is controlled for controlling for the stabilization of the vehicle behavior.

In such a vehicle brake apparatus, the motor driving device is used for continuous and stable assistance, and also used for controlling the displacement amount of the primary piston 726. Accordingly, it is desired to achieve the high accuracy, as well as the continuous and stable operation and the precise failure detection. If the charge amount of the battery 200 of the power source drops and the assist amount decreases, the system continues the brake assist operation using an auxiliary power source 400 as a power source. Since the auxiliary power source 400 is provided for emergency backup, a large output of the current should be eliminated. If, for example, the power source is switched to the auxiliary power source 400 and the current from the power source is limited to about ⅒ of the normal current, the assist control unit 706 of the present invention can detect even a small current with high accuracy by the motor driving device and control the motor current to control the power source current with high accuracy. Thus, the assist control unit 706 advantageously provides the braking device for a vehicle capable of continuing the control of the brake assist stably even with a battery in an abnormal state.

Figure 11:
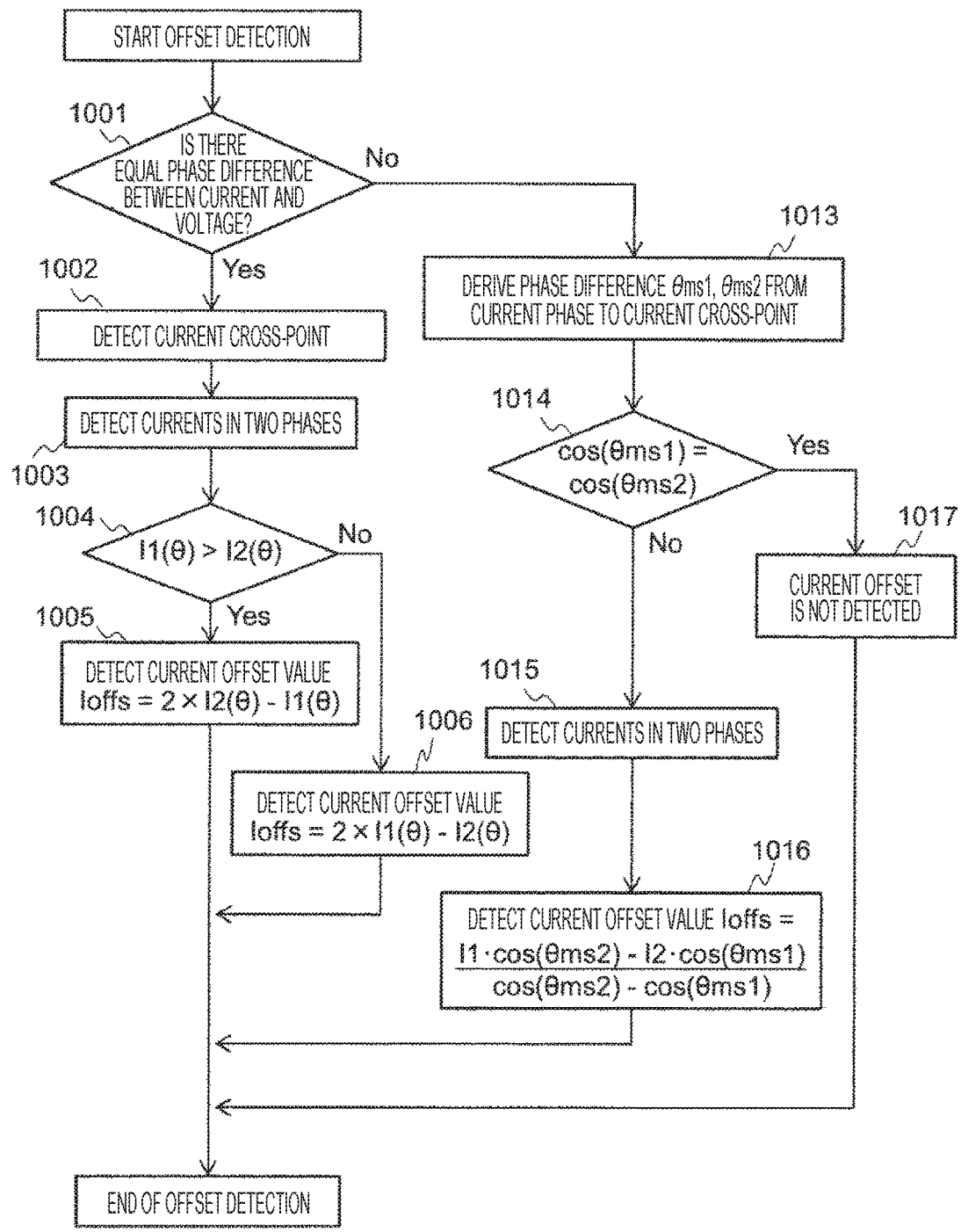
FIG. 11 is a flowchart illustrating a procedure of offset detection of the first and second embodiments.

FIG. 11 is a flow chart for explaining an embodiment of the present invention. The flowchart is described below.

In step 1001, it is determined whether a phase difference between current and voltage is small. If the phase difference is small, the process proceeds to step 1002. Otherwise, the process proceeds to step 1013.

In step 1002, a cross-point of the current is detected using the voltage command value, the PWM pulse width, or the rotational position θ. In step 1003, the maximum phase current and the minimum phase current are detected. In step 1004, the magnitude of the detected two current values is determined. In step 1005, the current offset value is detected using equation (1). In step 1006, the current offset value is detected using equation (2).

Next, the processing of step 1013 is described. In step 1013, the phase difference between the current phase and the rotational position θ at which the current cross-point is located is derived. In step 1014, it is determined whether the denominator of equation (10), which derives the offset value Ioffs, is zero. If the denominator is zero, the process proceeds to step 1017 and the current offset is not detected. If the current offset is detected, the currents in two phases are detected in step 1015. In step 1016, the current offset value is detected by equation (10).

One example of the detection procedure has been described above. The order of the steps of the determination procedure may be changed or some steps of the procedure may be skipped.

The present invention is not limited to the embodiments described above, and various changes may be provided without departing from the scope of the invention.

REFERENCE SIGNS LIST

100 Motor driving device
110 Current controller
111 Three-phase/dq calculator
120 Current detector
130 Inverter circuit
150 Rotational position detector
200 Battery
230 Pulse shift calculator

240 Offset detector
250 Current correction device
300 Motor
320 Rotational position sensor
500 Motor device

The invention claimed is:

1. An motor driving device configured to control driving of an inverter device that converts direct-current power supplied from a power source and outputs three-phase alternate-current power to a motor, wherein the motor driving device is configured to:
   detect a direct bus current flowing between the power source and the inverter device;
   calculate an offset current component to be superimposed on a detected value using the detected value where current values in two phases of a three-phase alternating current, which are calculated in accordance with the detected value of the direct bus current, substantially coincide with each other;
   control driving of the inverter device in accordance with a current value for which the offset current component is compensated;
   detect current values in two phases, namely, a maximum phase current value and a minimum phase current value, within a single cycle of a PWM carrier frequency; and
   compensate a value obtained by subtracting an absolute value of a difference between two absolute values, namely, the detected maximum phase current value and minimum phase current value, from the smaller value of the absolute values, as the offset current component.

2. The motor driving device according to claim 1, wherein the detected value used to calculate the offset current component is detected for approximately every 60 degrees or a multiple number of approximately 60 degrees of an electric angle of the motor.

3. The motor driving device according to claim 2, wherein the offset current component is calculated when a phase difference between the three-phase current and the three-phase voltage is approximately zero.

4. The motor driving device according to claim 1, wherein the detected value used to calculate the offset current component is detected when command values in any two phases of the three-phase alternating current voltage values substantially coincide with each other.

5. The motor driving device according to claim 4, wherein the offset current component is calculated when a phase difference between the three-phase current and the three-phase voltage is approximately zero.

6. The motor driving device according to claim 1, wherein the detected value used to calculate the offset current component is detected when PWM pulse widths in any two phases of the three-phase PWM pulse widths substantially coincide with each other.

7. The motor driving device according to claim 1, wherein the offset current component is calculated in accordance with an electric angle of the motor.

8. The motor driving device according to claim 7, wherein the offset current component is calculated using a first phase difference and a second phase difference, first phase difference being a difference between the electric angle at which a peak value of the minimum phase current of the three-phase alternating current is obtained and the electric angle corresponding to a rotational position of the motor, and the second phase difference being a difference between the electric angle at which a peak value of the maximum phase current of the three-phase alternating current is obtained and the electric current corresponding to the rotational position of the motor.

* * * * *